(12) United States Patent
Ohmori

(10) Patent No.: US 7,113,732 B2
(45) Date of Patent: Sep. 26, 2006

(54) COLOR-IMAGE FORMING DEVICE AND METHOD OF CONTROLLING THE SAME

(75) Inventor: Masatake Ohmori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 179 days.

(21) Appl. No.: 10/666,685

(22) Filed: Sep. 17, 2003

(65) Prior Publication Data
US 2004/0125392 A1 Jul. 1, 2004

(30) Foreign Application Priority Data
Sep. 20, 2002 (JP) .............................. 2002-275656

(51) Int. Cl.
*G03G 15/01* (2006.01)
(52) U.S. Cl. ........................ 399/301; 399/43
(58) Field of Classification Search ................ 347/116; 399/43, 301
See application file for complete search history.

(56) References Cited

U.S. PATENT DOCUMENTS

| | | |
|---|---|---|
| 5,881,173 A | 3/1999 | Ohmori |
| 6,160,640 A | 12/2000 | Ohmori |
| 6,310,681 B1 * | 10/2001 | Taniwaki .................... 355/55 |
| 6,327,453 B1 * | 12/2001 | Imaizumi et al. ........... 399/301 |
| 6,832,060 B1 * | 12/2004 | Tanaka et al. ............... 399/66 |

FOREIGN PATENT DOCUMENTS

| | | |
|---|---|---|
| JP | 2000-305340 | 11/2000 |
| JP | 2003-98793 | 4/2003 |
| JP | 2003-186278 | 7/2003 |

OTHER PUBLICATIONS

U.S. Appl. No. 09/919,570 of Ohmori, filed Jul. 31, 2001.
U.S. Appl. No. 10/010,875 of Ohmori, filed Nov. 12, 2001.
U.S. Appl. No. 10/230,532 of Ohmori et al., filed Aug. 29, 2002.

* cited by examiner

*Primary Examiner*—Arthur T. Grimley
*Assistant Examiner*—Ryan Gleitz
(74) *Attorney, Agent, or Firm*—Cooper & Dunham LLP

(57) ABSTRACT

A color-image forming device is provided with: a color-image forming unit for forming a color image by superimposing a plurality of images corresponding to a plurality of colors onto a recording medium. An automatic color-drift correction executes color-drift correction of color drift generated during the superimposition of the images. A color-drift correction execution interval setting unit variably sets the color-drift correction execution intervals, at which intervals the automatic color-drift correction executes the color-drift correction. The functions of the automatic color-drift correction and the color-drift correction execution interval setting unit are realized by the system control unit.

6 Claims, 16 Drawing Sheets

FIG.18

```
THE OUTPUT HAS BEEN MADE
DURING COLOR DRIFT CORRECTION.
   PLEASE CHECK THE IMAGE.
```

COLOR-IMAGE FORMING DEVICE AND METHOD OF CONTROLLING THE SAME

BACKGROUND OF THE INVENTION

1. Field of the Invention

The present invention generally relates to a color-image forming device that forms a color image by sequentially superimposing toner images of respective color components. In particular, the present invention relates to a color-image forming device, by means of which the timing for starting color-drift correction and the timing for canceling color-drift correction can be controlled.

2. Description of the Related Art

Among various color-image forming devices for color image outputs, a color-image forming device that utilizes the electrophotographic process forms the color image using, for example, toners of four different colors, such as Yellow, Magenta, Cyan, and blacK. Unless high position precision is provided when superimposing the toner images of the four colors, color drift, which is the artifact observed on the final color image, may be generated due to the positional deviation of each toner images, and thus the image quality may be degraded. Accordingly, in such a color-image forming device, a color-drift correction is executed in order to correct the color drift.

Specifically, in the color-image forming device, image-forming parts are provided for the four colors. Each image-forming parts is provided with a photoconductor, and an electric charging part, an exposure part, a developing part, and a cleaner, all of which are provided around the photoconductor. The surface of the photoconductor is uniformly and electrically charged by the electric charging part, the electrically charged surface is exposed to the laser beam emitted from the exposure part, and an electrostatic latent image is formed on the photoconductor. The latent image is developed by the developing part.

Meanwhile, a recording medium is provided to a first image-forming part (yellow), where the toner image on the photoconductor is transferred onto the recording medium. The recording medium is sequentially provided to other image-forming parts corresponding to other colors and at the respective image-forming parts, the toner images of respective colors are transferred onto the recording medium. When the transfer of image is completed, unnecessary toner left on the surface of the photoconductor is cleaned by the cleaner and is prepared for the next image formation. The recording medium having the toner images of respective colors transferred thereon is provided to a fixing part, where the toner is fixed onto the recording medium, and the final image is output.

In such a color-image forming device, when the positional deviation from the predetermined transfer position generates during the transferring of the toner images of respective colors onto the recording medium, the color drift generates due to misalignment of the toner images and therefore, the image quality of the color image to be formed degrades significantly.

As for the cause of the positional deviation of the toner images, sub-scanning registration deviation due to difference between the axes of photoconductors provided in the respective image-forming parts, inclination deviation due to misalignment of inclination in the main-scanning direction of the photoconductor and inclination of the optic systems, main-scanning registration deviation due to deviation of writing position of the images, and magnification deviation due to the difference in the length of scanning lines for respective colors may be considered.

In order to cope with such positional deviation of the toner images, various positional deviation adjustment methods are employed conventionally. For the sub-scanning registration deviation and the main-scanning registration deviation, a method of adjusting the scanning timing of the writing of the latent image by the exposure part may be employed. For the inclination deviation, a method of adjusting the inclination of a reflection mirror provided on the light path of the image-forming part may be employed. For the magnification deviation, a method of changing writing clocks of the writing of the latent image or a method of displacing the reflection mirror may be employed.

Further, as shown in FIG. 1, for example, three sensors 100 may be arranged in the main-scanning direction orthogonal to the feeding direction (rotational direction and sub-scanning direction) of a transfer belt 200. The number of sensors is arbitrary. At a plurality of positions on the surface of the transfer belt 200, which positions are to be read by the sensors, a toner mark (pattern) 300 (see also, FIG. 2) for position detection is formed by respective image-forming parts. Each sensor reads the toner mark, and the positional deviation of the toner image is detected based on the output from the sensors. Depending on the condition of the positional deviation of the toner images detected based on the output, the positions of the images formed by the image-forming parts on the photoconductor are adjusted so as to correct the color drift generated due to the positional deviation of the toner images. For the details of the above-mentioned. technique, see for example, Japanese Laid-Out Application No. 2003-186278.

For example, when the automatic color-drift correction is executed, a mark for color-drift correction is written onto an intermediate transfer medium, the written marks are detected by a sensor, and the writing position color-drift correction is electrically or mechanically executed depending on the detected result. (See for example, Japanese Laid-Open Patent Application No. 2000-305340.)

However, a single operation of such a color-drift correction in a single color-image forming device is not satisfactory. Rather, such a color-drift correction is to be executed according to various condition changes including, for example, ambient atmospheric changes such as temperature and relative humidity, variation per hour of the color-image forming device, exchange timing of toners or photoconductors, etc. In other words, various factors such as mentioned above may lead to the generation of such color drift.

In general, the color-drift correction is automatically executed in response to the condition changes such as mentioned above. However, the color-drift correction needs a predetermined amount of time (ranging from a few seconds to a few minutes) and therefore, there arises a problem in that the color-image forming device is not ready for use until the color-drift correction is completed even when a user of the device wishes to use it right away.

In addition, in the case when the color-image forming device has not been used for a predetermined period and when such a device is given a task (for example, for printing out), there arises a problem in that the device first begins the color-drift correction operation and thus the printing output cannot be quickly obtained.

SUMMARY OF THE INVENTION

In view of the above-mentioned problems, it is a general object of the present invention to provide a color-image forming device, by means of which images with as high quality as possible can be obtained and latency time for color-drift correction can be minimized when the user wishes to use the color-image forming device.

According to the present invention, there is provided a color-image forming device comprising a color-image forming unit for forming a color image by superimposing a plurality of toner images corresponding to a plurality of colors onto a recording medium; an automatic color-drift correction unit for executing a color-drift correction of color drift generated during the superimposition of the images; and a color-drift correction execution interval setting unit for variably setting color-drift correction execution intervals, at which intervals, the automatic color-drift correction unit executes the color-drift correction.

Since the color-image forming device according to the present invention enables the service person or the user to set the color-drift correction execution interval, it is possible to execute the color-drift correction depending on a particular application or the actual usage frequency of the device. Thus, the user-friendliness of the device is improved.

The color-image forming device according to the present invention may further comprise a color-drift correction execution time setting unit for setting a color-drift correction execution time, at which time, the automatic color-drift correction unit starts the color-drift correction.

Since the color-image forming device according to the present invention enables executing the color-drift correction at the previously set color-drift correction execution time, it is possible to have the color-drift correction completed before the starting time of the workday in offices, etc. Therefore, it is possible to provide output with high image quality without any latency time when a task is required to the color-image forming device first thing at the time of starting time.

According to the color-image forming device of the present invention, the automatic color-drift correction unit may be capable of executing the color-drift correction in a plurality of correction modes, which correction modes are different in time required for the color-drift correction according to precision of the color-drift correction.

According to the color-image forming device of the present invention, the automatic color-drift correction unit may be capable of executing the color-drift correction in a first correction mode, which mode requires a long time for achieving higher precision for the color-drift correction, and in a second correction mode, which mode requires a less time for achieving reduced precision for the color-drift correction. The automatic color-drift correction unit may execute the color-drift correction in the first correction mode at the previously set color-drift correction execution time and may execute the color-drift correction in the second correction mode at times other than the previously set color-drift correction execution time.

By having different correction modes for the color-drift correction, it is possible, for example, to execute the color-drift correction in the second correction mode during daytime when shorter latency time is preferred and to execute the color-drift correction in the first correction mode during nighttime when longer latency time is not a concern. Accordingly, higher overall image quality can be obtained on average.

The color-image forming device according to the present invention may further comprise a manual color-drift correction unit for executing the color-drift correction in the first correction mode at times other than the-previously set color-drift correction execution time according to an instruction from a user.

Since the user can select executing the color-drift correction with high precision (in first correction mode) when the user determines that the image quality after the color-drift correction with high velocity (in the second correction mode) is not satisfactory, it is possible to obtain image quality according to the user's application. The manual color-drift correction unit is effective when, for example, the color-drift correction in the second correction mode is satisfactory for the plain text color documents but not for the documents with photographs.

In the color-image forming device according to the present invention, the color-drift correction execution time setting unit may be capable of setting the color-drift correction execution time on a day-of-the-week basis.

Accordingly, it is possible to save toner and reduce power consumption by setting that the color-drift correction is not to be executed on holidays, since such a color-drift correction is not necessary on holidays.

The color-image forming device according to the present invention may further comprise a task interval measuring unit for measuring intervals, at which intervals, tasks are given to the color-image forming device. The color-drift correction execution interval setting unit may set the color-drift correction execution intervals based on the measured result from the task interval measuring unit.

Since it is possible to set the color-drift correction execution interval according to the usage frequency, it is possible to execute the color-drift correction so that the user can obtain images with averaged high image quality when the user wishes to use the device.

The color-image forming device according to the present invention may further comprise a task time measuring unit for measuring times, at which times tasks are given to the color-image forming device. The color-drift correction execution time setting unit may set the color-drift correction execution time based on the measured result from the task time measuring unit.

Since it is possible to determine the color-drift correction execution time according to the time when the device is given tasks, it is possible to execute the color-drift correction so that the user can obtain images with averaged high image quality when the user wishes to use the device. Also, the number of cases in which the device starts the color-drift correction for a long time when the user wishes to use the device can be reduced.

Further, according to the present invention, there is provided a color-image forming device, which comprises a color-image forming unit for forming a color image by superimposing a plurality of images corresponding to a plurality of colors onto a recording medium; an automatic color-drift correction unit for executing a correction of color drift generated during the superimposition of the images; and a color-drift correction cancellation unit for canceling the color-drift correction being executed by the automatic color-drift correction unit when an output of the color image is requested during the color-drift correction.

Since it is possible to provide the output even when the device has already started the color-drift correction by canceling the relevant color-drift correction, the latency time for providing the output can be reduced.

The color-image forming device according to the present invention may further comprise a priority setting unit for setting priority to the color-drift correction, whereby it is determined whether or not the color-drift correction is cancelled when the output of the color image is requested during the color-drift correction.

Accordingly, if high image quality is always required, then the priority is given to the color-drift correction. If less latency time is required, then the priority is given to the cancellation of the color-drift correction. Thus, the user-friendliness of the device is improved.

According to the present invention, there is provided a color-image forming device comprising: a color-image forming unit for forming a color image by superimposing a plurality of images corresponding to a plurality of colors onto a recording medium; an automatic color-drift correction unit for executing a correction of color drift generated during the superimposition of the images; and an image quality determination unit for determining whether image quality when an output of the color image is requested during the color-drift correction satisfies predetermined image quality. When it is determined that the image quality when the output of the color image is requested satisfies the predetermined image quality, the color image is provided; and when it is determined that the image quality when the output of the color image is requested does not satisfy the predetermined image quality, the image color is provided after a warning is given to a user.

Accordingly, it is possible to inform the user that the output will be provided without sufficient color-drift correction. Thus, the user-friendliness of the device is further improved.

In the color-image forming device according to the present invention, the warning may be given in the form of a lamp.

Thus, it is possible to alert the user by flashing, etc., that the output is provided without sufficient color-drift correction. Therefore, the user-friendliness of the device is improved.

Further, in the color-image forming device according to the present invention, the warning may be given on a display of a computer, from which computer the output of the color image is requested.

Thus, it is possible to signal to the user through the display that the printing is executed without sufficient color-drift correction. Therefore, the user-friendliness of the device is further improved.

According to the present invention, there is also provided a method for controlling color-drift correction timing of a color-image forming device. The method comprises the steps of: forming a color image by superimposing a plurality of images corresponding to a plurality of colors onto a recording medium; variably setting a color-drift correction execution intervals, at which color-drift correction execution intervals an automatic color-drift correction unit executes a correction of color drift generated during the superimposition of the images; and executing the color-drift correction by the automatic color-drift correction unit at the previously set color-drift correction execution intervals.

The method according to the present invention may further comprise the step of setting a color-drift correction execution time, at which color-drift correction execution time the automatic color-drift correction unit starts the color-drift correction.

The method according to the present invention may further comprise the step of executing the color-drift correction in a plurality of correction modes, which correction modes are different in time required for the color-drift correction according to precision of the color-drift correction.

The method according to the present invention may further comprise the steps of: executing the color-drift correction in a first correction mode, which first correction mode requires a long time for achieving higher precision for the color-drift correction, at the previously set color-drift correction execution time; and executing the color-drift correction in a second correction mode, which second correction mode requires a less time for achieving reduced precision for the color-drift correction, at times other than the previously set color-drift correction execution time.

The method according to the present invention may further comprise the step of manually executing the color-drift correction in the first correction mode at times other than the previously set color-drift correction execution time according to an instruction from a user.

In the method according to the present invention, the step of setting a color-drift correction execution time may further comprise the step of setting the color-drift correction execution time on a day-of-the-week basis.

The method according to the present invention may further comprise the step of measuring intervals, at which intervals tasks are given to the color-image forming device, and therefore, the step of variably setting a color-drift correction intervals further comprises the steps of setting the color-drift correction execution intervals based on the measured interval.

The method according to the present invention may further comprise the step of measuring times, at which times tasks are given to the color-image forming device, and therefore, the step of setting a color-drift correction execution time further comprises the steps of setting the color-drift correction execution time based on the measured time.

According to the present invention, there is provided a method for controlling color-drift correction timing of a color-image forming device. The method according to the present invention comprises the steps of forming a color image by superimposing a plurality of images corresponding to a plurality of colors onto a recording medium; executing a correction of color drift generated during the superimposition of the images; and canceling the color-drift correction when an output of the color image is requested during the color-drift correction.

The method according to the present invention may further comprise the step of setting priority to the color-drift correction, whereby it is determined whether or not the color-drift correction is cancelled when the output of the color image is requested during the color-drift correction.

According to the present invention, there is provided a method for controlling color-drift correction timing of a color-image forming device. The method according to the present invention comprises the steps of forming a color image by superimposing a plurality of images corresponding to a plurality of colors onto a recording medium; executing a correction of color drift generated during the superimposition of the images; determining whether image quality when the output of the color image is requested during the color-drift correction satisfies predetermined image quality; providing the color image when it is determined that the image quality when an output of the color image is requested satisfies the predetermined image quality; and providing the color image after a warning is given to a user when it is determined that the image quality when the output of the color image is requested does not satisfy the predetermined image quality.

In the method according to the present invention, the warning may be given in the form of a lamp.

In the method according to the present invention, the warning may be given on a display of a computer, from which computer the output is requested.

Therefore, according to the present invention, it is possible to provide a color-image forming device, by means of which an image with as high quality as possible can be provided with minimum latency time when the user wishes to use the device. The present invention can be expected to be applied in the fields of, in particular, a color printer, a color facsimile, a color printing apparatus provided with transmission capability, and a color transmission apparatus combining a personal computer and a printer, etc.

BRIEF DESCRIPTION OF THE DRAWINGS

FIG. 18 shows a screen display example of a twelfth embodiment according to the present invention using the color-image forming device of FIG. 3.

DETAILED DESCRIPTION OF THE PREFERRED EMBODIMENTS

In the following, principles and embodiments of the present invention will be described with reference to the accompanying drawings.

Figure 1:
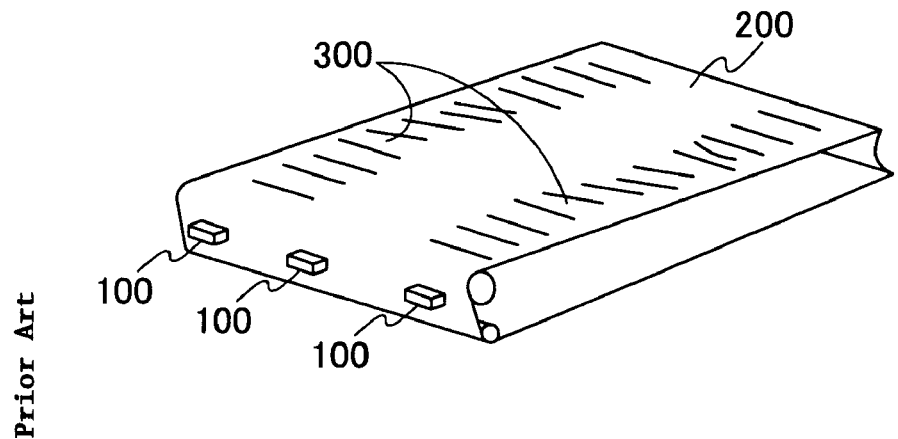
FIG. 1 is a diagram showing a positional relation of sensors with respect to patterns transferred onto a transfer belt.
Figure 2:
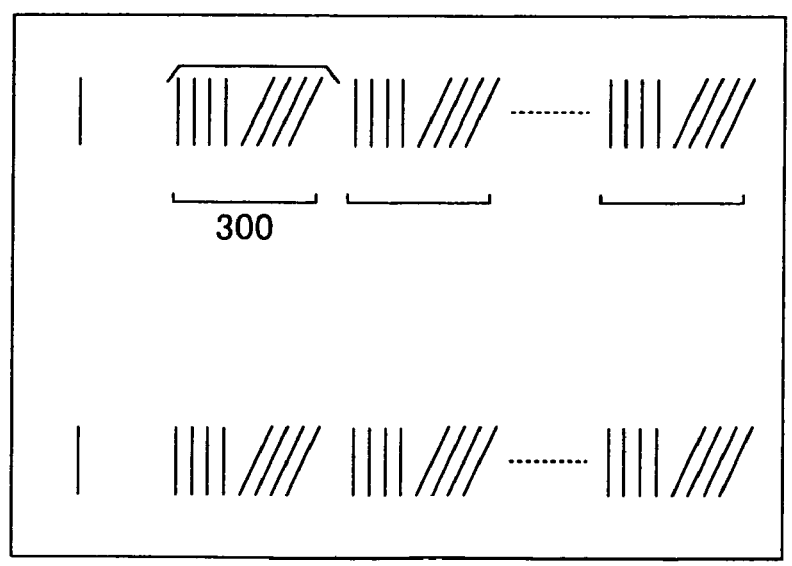
FIG. 2 is a diagram showing the patterns transferred onto the transfer belt.
Figure 3:
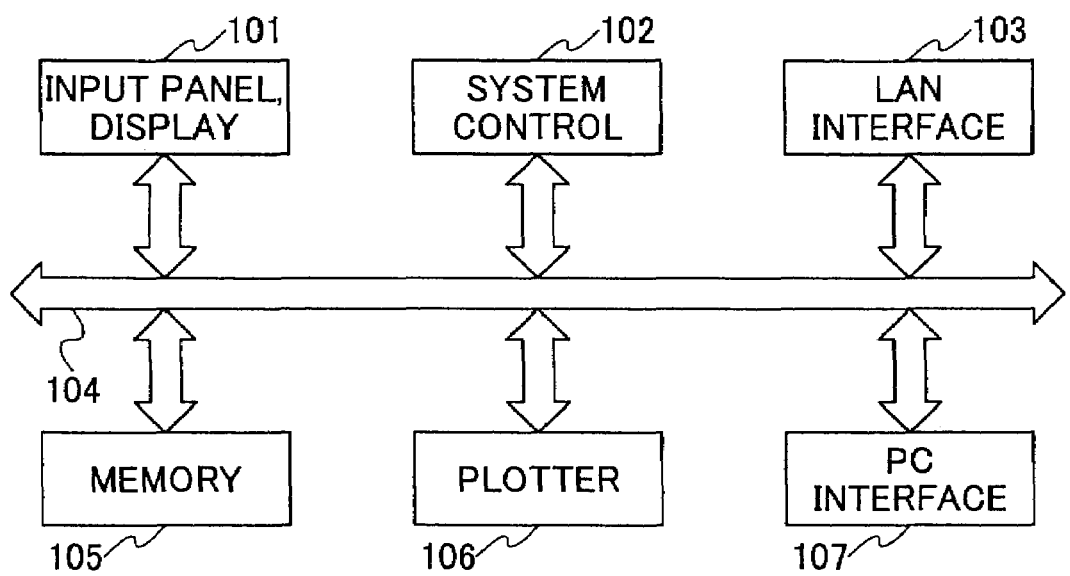
FIG. 3 is a block diagram of a color-image forming device as an embodiment of the present invention.

FIG. 3 is a block diagram of a color-image forming device as an embodiment of the present invention.

In FIG. 3, an operation display unit 101 corresponds to a user interface part for executing various operations, entering set values, etc. The operation display part 101 comprises an operation panel and a display. A variety of information is displayed on the display.

A system control unit 102 comprises a central processing unit (CPU), a timer, a random-access memory (RAM), a read-only memory (ROM), etc., and controls overall operation of the color-image forming device.

A local area network (LAN) interface unit 103 corresponds to an interface part for data exchange with external devices. Such an interface part includes 100 Base-T and IEEE 802.11b, for example.

A personal computer (PC) interface unit 107 comprises an IEEE 1284 (a so-called parallel interface), a universal serial bus (USB), etc., and has an interface function that executes data exchange with the PC.

A memory unit 105 comprises a semiconductor memory, a hard disk, etc., and temporarily stores data for printing.

A plotter unit 106 has the ability to output color images. In the present embodiment, the plotter unit 106 is of an electrophotographic type wherein writing units of four colors are arranged in parallel in a so-called tandem system enabling forming an image with four colors in a single pass. It is to be noted that the scope of application of the present invention is not limited to the above-mentioned. In other words, the present invention can be broadly applied to any plotter unit that needs a color-drift correction.

A system bus 104 is for exchanging data between respective modules within the color-image forming device.

Figure 4:
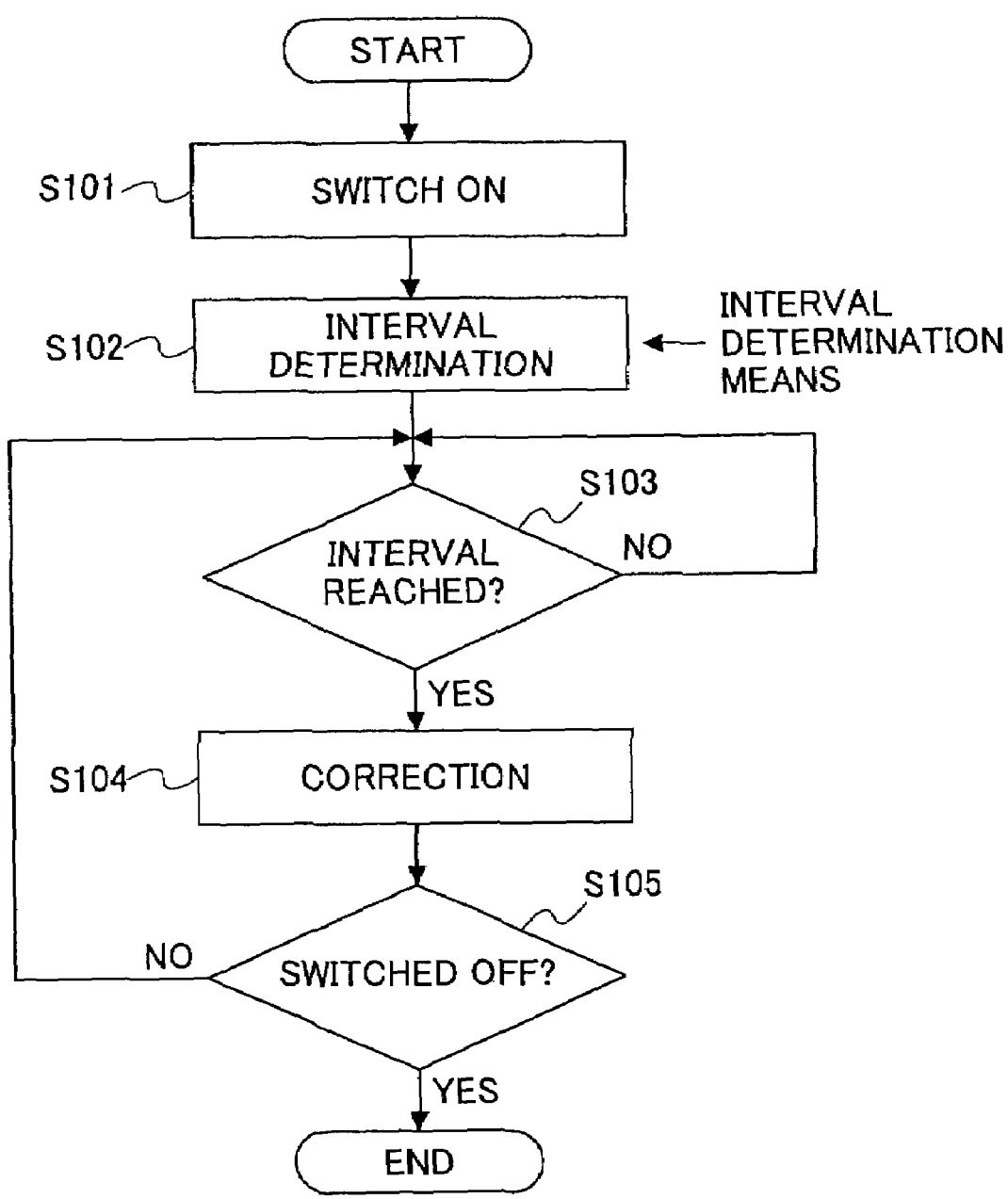
FIG. 4 is an operational flow chart of a first embodiment according to the present invention using the color-image forming device of FIG. 3.

FIG. 4 is an operational flow chart of a first embodiment according to the present invention. When the color-image forming device is switched on (S101), a color-drift correction execution interval is set by color-drift correction execution interval setting means (S102). Then, it is determined whether the previously set color-drift correction execution interval is-reached (whether the previously set color-drift correction execution interval has passed) (S103). When it is determined that the color-drift correction execution interval is reached (that the color-drift correction execution interval has passed), the color-drift correction by an automatic color-drift correction means is executed (S104). When the color-image forming device is switched off after S104, the process ends and when the device is not switched off after S104, the process returns to S103 (S105).

In the above-mentioned first embodiment of the present invention, the color-image forming device is provided with the color-drift correction execution interval setting means, by which the service person or the user can determine the color-drift correction execution intervals. The color-drift correction execution interval setting means are realized by the operation panel of the operation display unit 101, the CPU of the system control unit 102, programs stored on ROM, etc.

If the color-drift correction execution interval is short, high image quality may be maintained; however the frequency at which the recording material is consumed becomes high since the recording material is used at every time of color-drift correction. In addition, the power consumed becomes large. Accordingly, by setting the time interval for automatic color-drift correction by taking the usage frequency of the device and the requested image quality of the output into consideration, it is possible to set the image-forming device to meet the user's preference. Thus, the user-friendliness of the device can be improved.

The color-drift correction is repeated until the color-image forming device is switched off.

Figure 5:
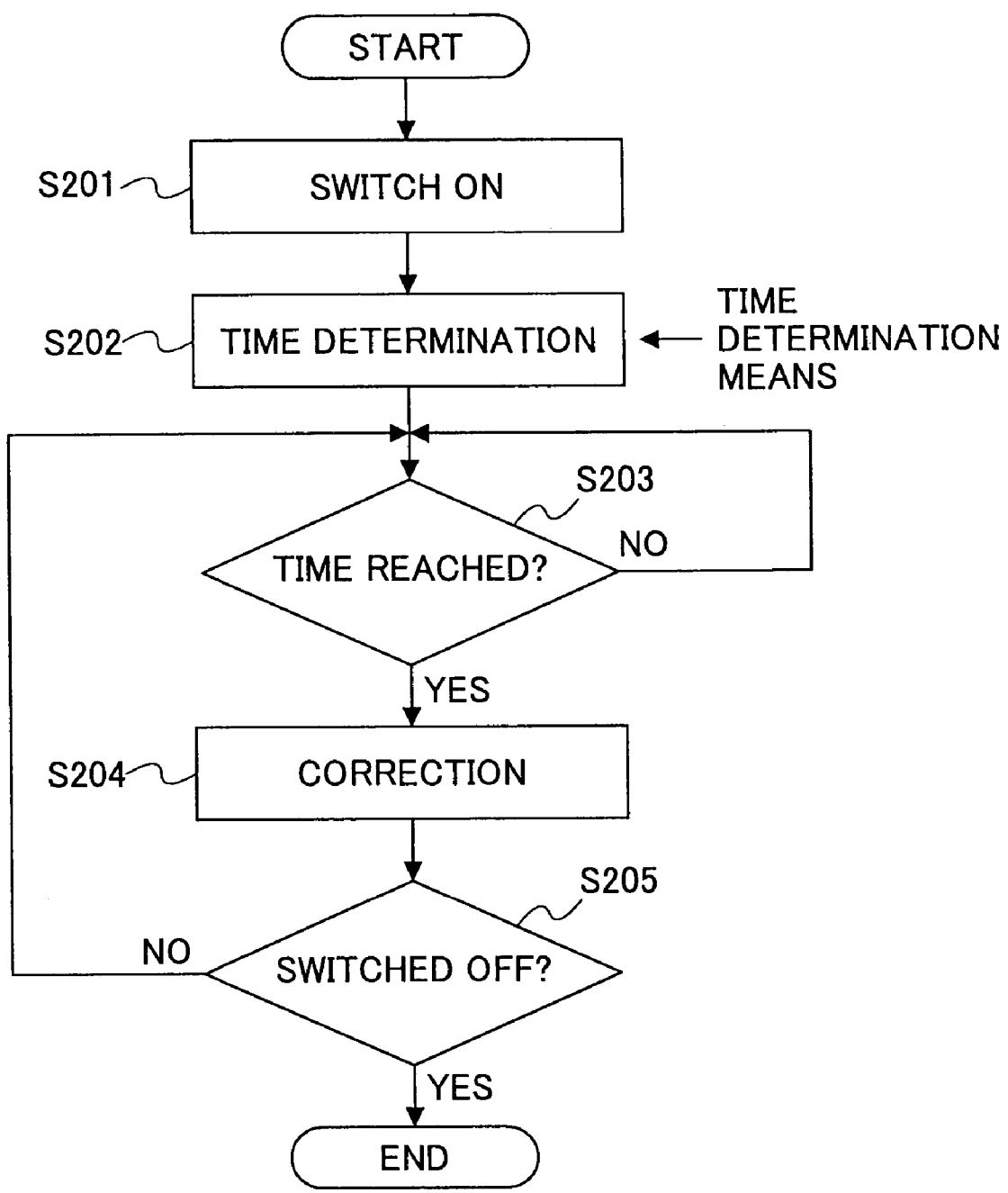
FIG. 5 is an operational flow chart of a second embodiment according to the present invention using the color-image forming device of FIG. 3.

FIG. 5 is an operational flow chart of a second embodiment according to the present invention. When the color-image forming device is switched on (S201), a color-drift correction execution time is set by color-drift correction execution time setting means (S202). Then, it is determined whether the previously set color-drift correction execution time is reached (S203). When it is determined that the color-drift correction execution time has reached, the color-drift correction by the automatic color-drift correction means is executed (S204). When the color-image forming device is switched off after S204, the process ends and when the device is not switched off after S204, the process returns to S203 (S205).

In the second embodiment according to the present invention, it is assumed that the color drift due to changes over time is to be corrected as in the first embodiment according to the present invention. However, in contrast to the first embodiment, in the second embodiment of the present invention, the time of executing the color-drift correction is set instead of the color-drift correction execution interval. The timer incorporated in the color-image forming device obtains the time of the day. The color-image forming device executes color-drift correction at the previously set time every day. For example, in an office, if the color-image forming device is to execute the color-drift correction at the time when a first task is given (i.e. when a first printout is to be made), low velocity may be necessary before obtaining the first printout. However, if the device is scheduled to execute the color-drift correction sometime before the starting time of the workday, in other words if the device has already completed the color-drift correction before the starting time of the workday, the first printout of the day can be readily obtained and thus the user-friendliness of the device is improved.

The frequency of the color-drift correction is not limited to once a day. The color-drift correction can be executed as many times as possible according to need in a day.

Figure 6:
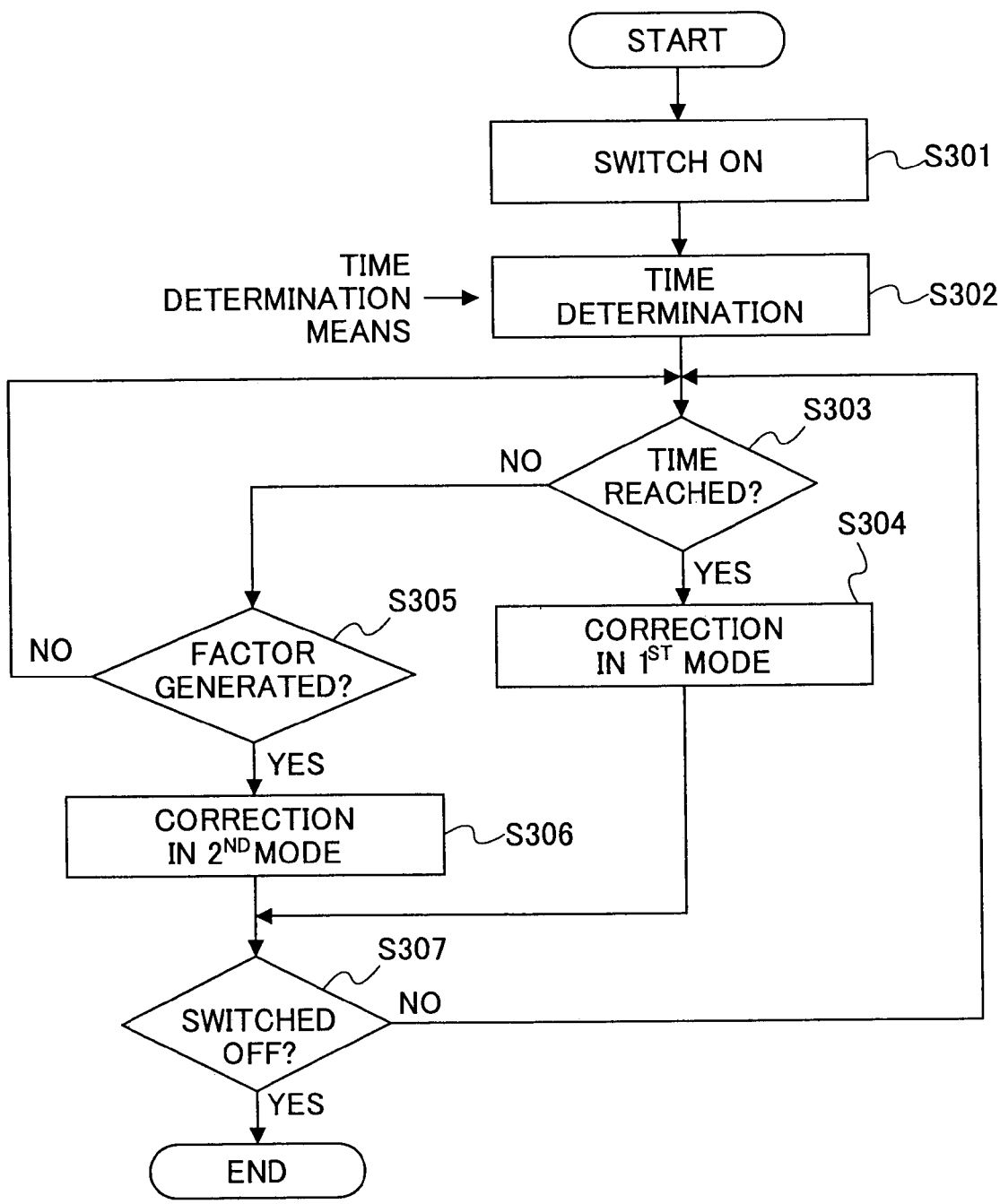
FIG. 6 is an operational flow chart of a third embodiment according to the present invention using the color-image forming device of FIG. 3.

FIG. 6 is an operational flow chart of a third embodiment according to the present invention. When the color-image forming device is switched on (S301), the color-drift correction execution time is set by the color-drift correction execution time setting means (S302). Then, it is determined whether the set time is reached (S303). When it is determined that the color-drift correction execution time is reached, color-drift correction according to a first correction mode is executed by the automatic color-drift correction means (S304). When the color-image forming device is switched off after S304, the process ends and when the device is not switched off after S304, the process returns to S303 (S307). When it is determined that the color-drift correction execution time is not yet reached in S303, it is determined whether a color-drift correction execution factor is generated (S305). When it is determined that the color-drift correction execution factor is not generated, the process returns to S303. When it is determined that the color-drift correction execution factor is generated in S305, the color-drift correction according to a second correction mode is executed by the automatic color-drift correction means (S306). When the color-image forming device is switched off after S306, the process ends and when the device is not switched off after S306, the process returns to S303.

The third embodiment of the present invention concerns the color-image forming device having the first correction mode (high precision mode) and the second correction mode (high velocity mode) for correcting the color drift. In the first correction mode, high precision color-drift correction can be executed but it takes time. In the second correction mode, high velocity color-drift correction can be executed but the color-drift correction precision is inferior to that of the first correction mode.

Figure 7:
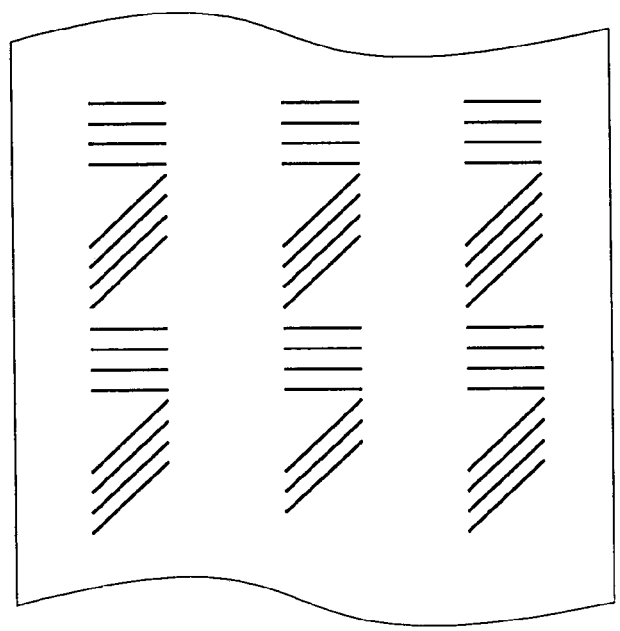
FIG. 7 is an example of a pattern for rough color-drift correction to be transferred onto a recording medium.
Figure 8:
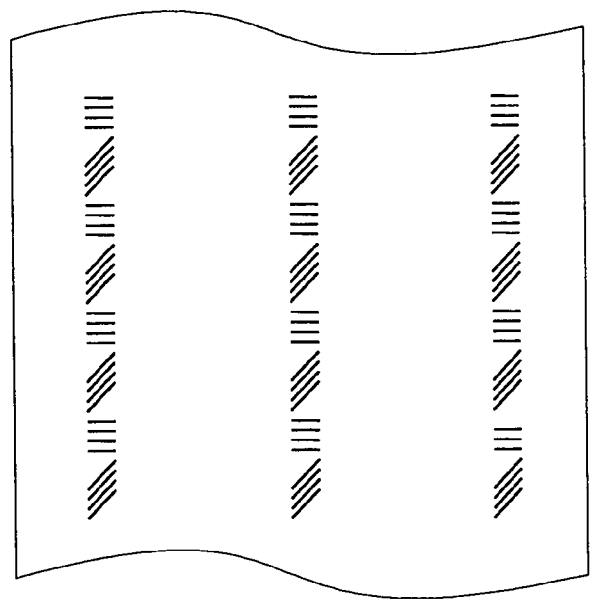
FIG. 8 is an example of a pattern for fine color-drift correction to be transferred onto a recording medium.

FIG. 7 shows an example of a pattern for rough color-drift correction to be transferred onto the recording medium. FIG. 8 shows an example of a pattern for fine color-correction to be transferred onto the recording medium.

Figure 9:
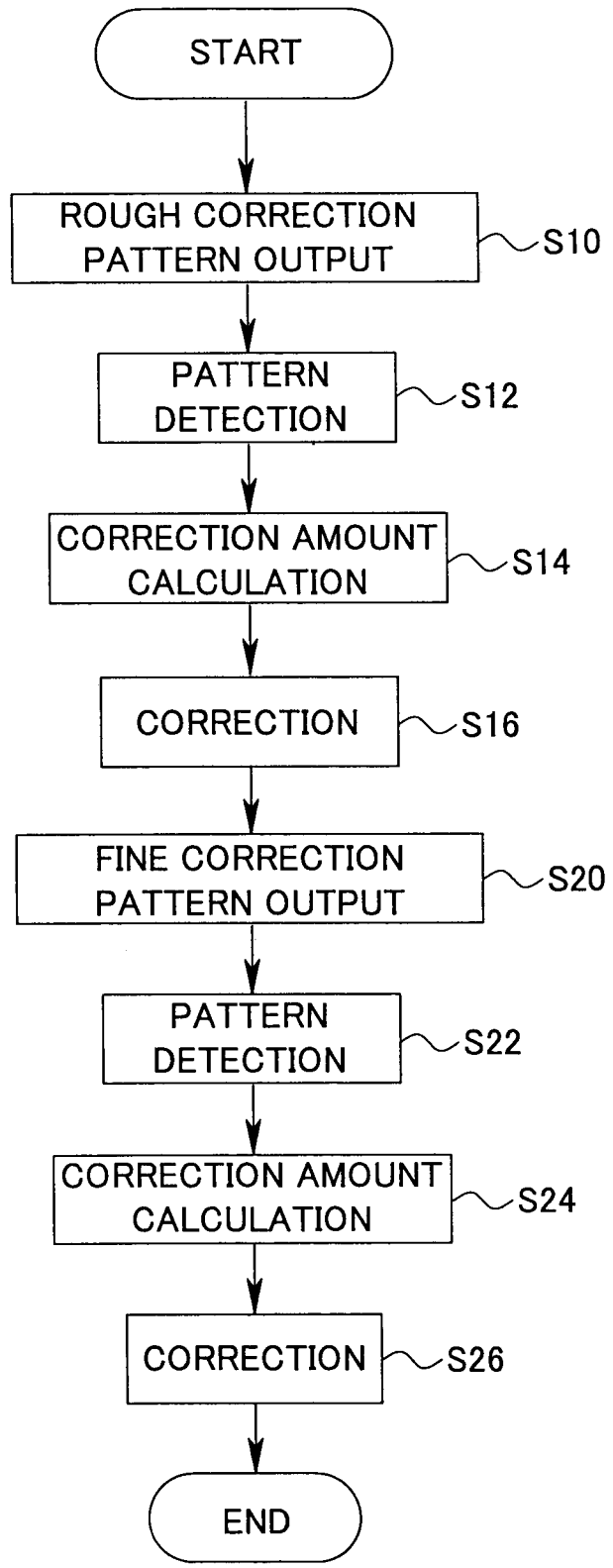
FIG. 9 is an operational flow chart of a first correction mode.

The first correction mode according to the present invention follows the following procedure. In other words, as shown in FIG. 9, after the pattern for rough color-drift correction, such as shown in FIG. 7, is transferred onto the recording medium (S10), the condition of the transferred pattern on the recording medium detected (S12). Then, the amount of rough color-drift correction is calculated from the detected condition of the transferred pattern on the recording medium (S14) and the rough color-drift correction is executed based on the calculated amount of color-drift correction (S16). Then, the pattern for fine color-drift correction, such as shown in FIG. 8, is transferred to the recording medium (S20) and the condition of the transferred pattern on the recording medium is detected (S22). Then, the amount of fine color-drift correction is calculated from the detected condition of the transferred pattern on the recording medium (S24) and the fine color-drift correction is executed based on the calculated amount of color-drift correction (26). Accordingly, finely color-drift-corrected color image can be obtained.

Figure 10:
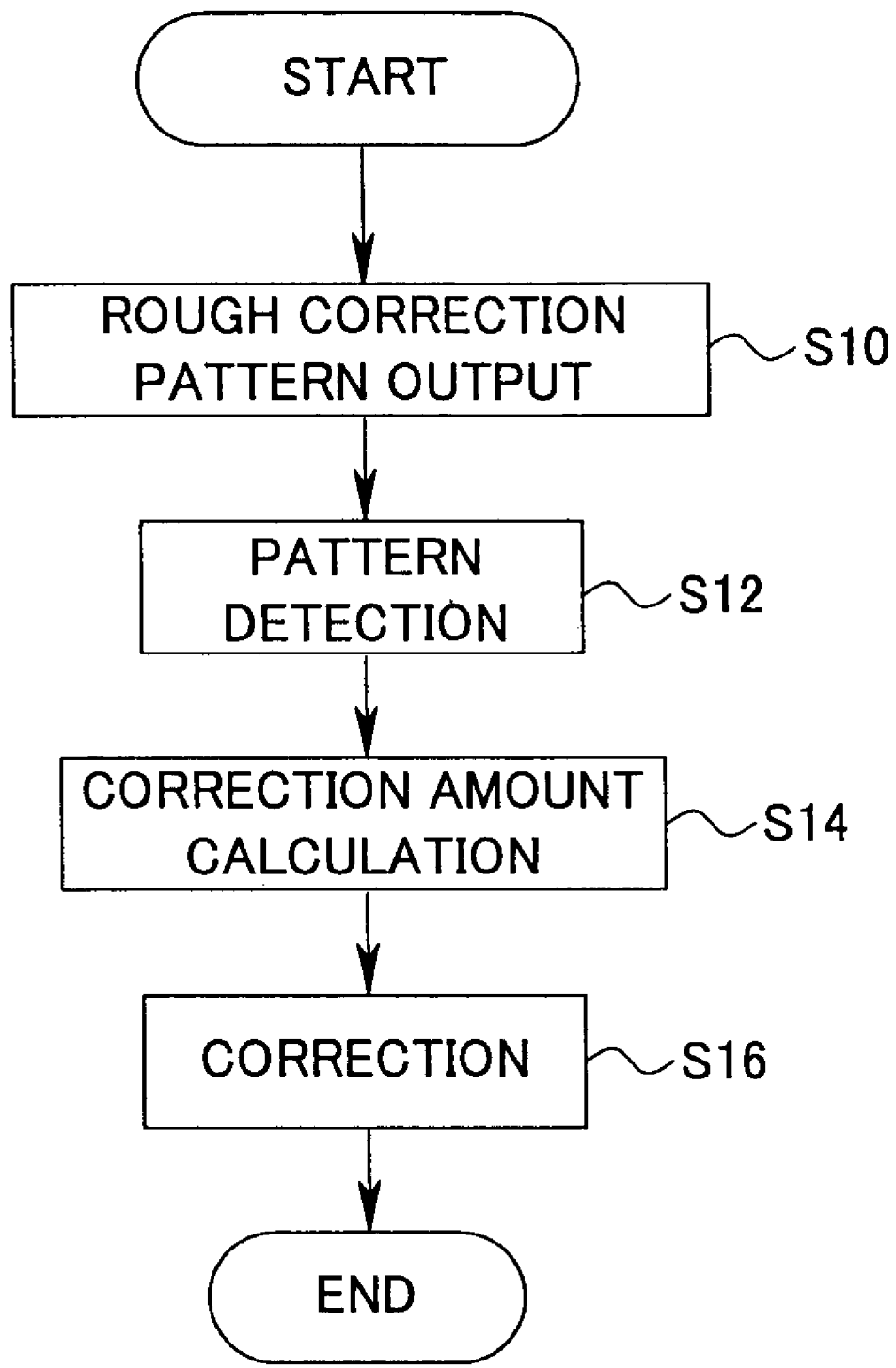
FIG. 10 is an operational flow chart of a second correction mode.

Meanwhile, in the second correction mode according to the present invention, only the following procedure is executed. As shown in FIG. 10, in the second correction mode, the pattern for rough color-drift correction, such as shown in FIG. 7, is transferred onto the recording medium (S10) and the condition of the transferred pattern on the recording medium is detected (S12). Then, the amount of rough color-drift correction is calculated from the detected condition of the transferred pattern on the recording medium (S14) and the rough color-drift correction is executed based on the calculated amount of color-drift correction (S16). Accordingly, roughly color-drift-corrected color image can be obtained with a shorter time than for the first correction mode.

Accordingly, the execution of the fine color-drift correction is the only difference between these two color-drift correction modes. The final precision of the first correction mode is higher than the final precision of the second correction mode.

It is to be noted that the manners for realizing these two correction modes with different durations until the completion of the color-drift correction are not limited to the above-described examples. In other words, various correction modes with more than two durations may be combined so as to realize the purpose of color-drift correction.

For example, when the color-drift correction is necessary during daytime, the color-drift correction in the second correction mode (high velocity mode) may be executed since the frequency of printing out is high and it is better to make latency time short during the daytime. The color-drift correction in the first correction mode (high precision mode) may be executed during nighttime when the usage frequency of the color-image forming device is low so that the device can be used on the following morning having the color drift already corrected with high precision. Accordingly, both high image quality and reduction of latency time can be achieved on average.

Figure 11:
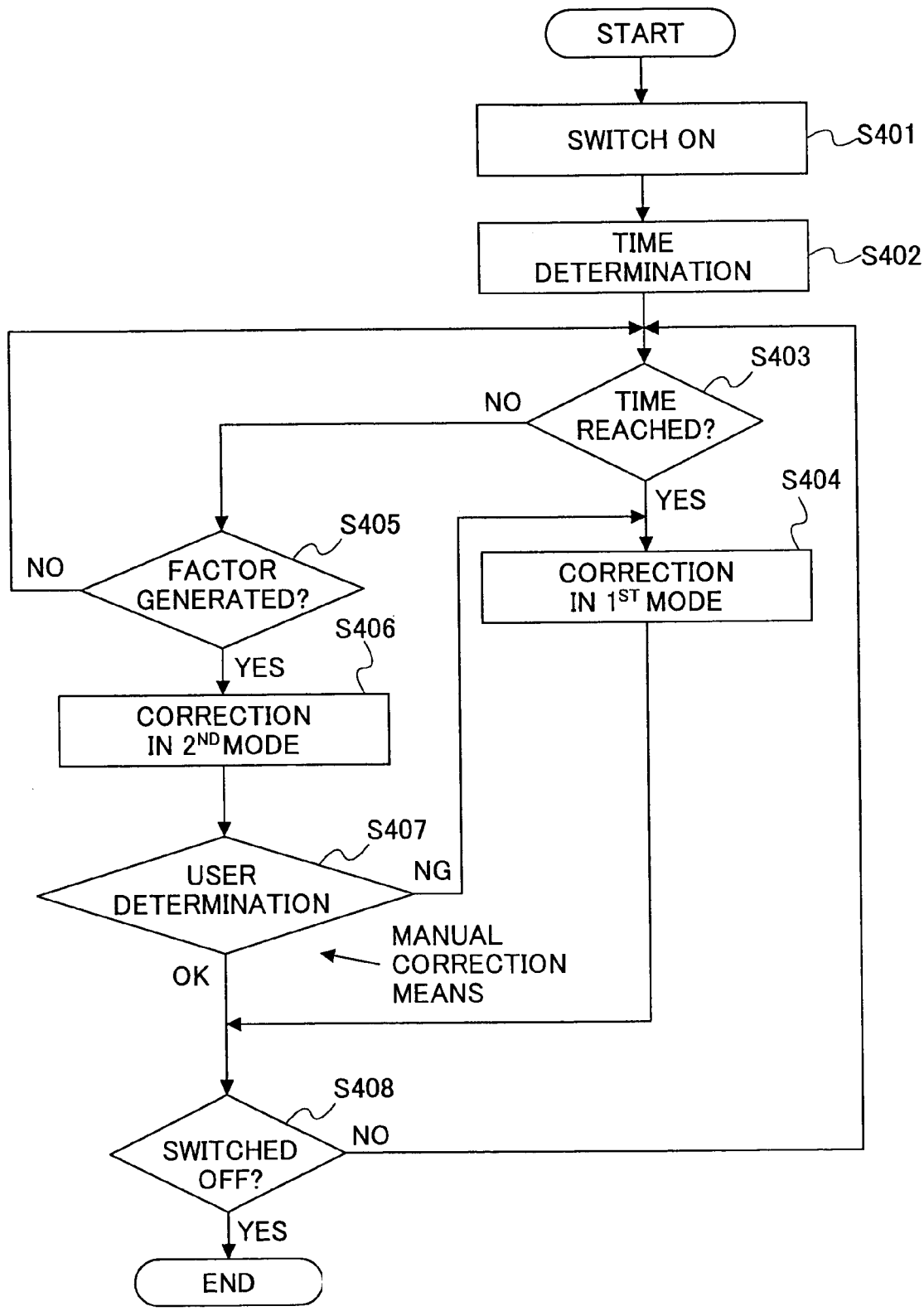
FIG. 11 is an operational flow chart of a fourth embodiment according to the present invention using the color-image forming device of FIG. 3.

FIG. 11 is an operational flow chart of a fourth embodiment according to the present invention. When the color-image forming device is switched on (S401), the color-drift correction execution time is set by the color-drift correction execution time setting means (S402). Then, it is determined whether the set color-drift correction execution time is reached (S403). When it is determined that the color-drift correction execution time is reached, the color-drift correction according to the first correction mode is executed by the automatic color-drift correction means (S404). When the color-image forming device is switched off after S404, the process ends and when the device is not switched off after S404, the process returns to S403 (S408). When it is determined that the color-drift correction execution time is not yet reached in S403, it is determined whether the color-drift correction execution factor is generated (S405). When it is determined that the color-drift correction execution factor is not generated, the process returns to S403. When it is determined that the color-drift correction execution factor is generated in S405, color-drift correction according to the second mode is executed (S406), after which, user setting (whether a manual color-drift correction is necessary or not) is executed (S407). If the user determines the image quality is not satisfactory, the process returns to S404 where the color-drift correction according to the first correction mode is executed. If the user determines that the image quality is satisfactory, then the process ends when the image-forming device is switched off and returns to S403 when the device is not switched off.

The fourth embodiment according to the present invention enables executing, at times other than the previously set color-drift correction execution time, the color-drift correction according to the first correction mode (high precision mode) by the user's setting. This is to improve the output image quality by executing color-drift correction according to the first correction mode again, which color-drift correction is triggered by the user's indication, when the output color image after the color-drift correction according to the second correction mode is executed does not meet the user's expectation.

Figure 12:
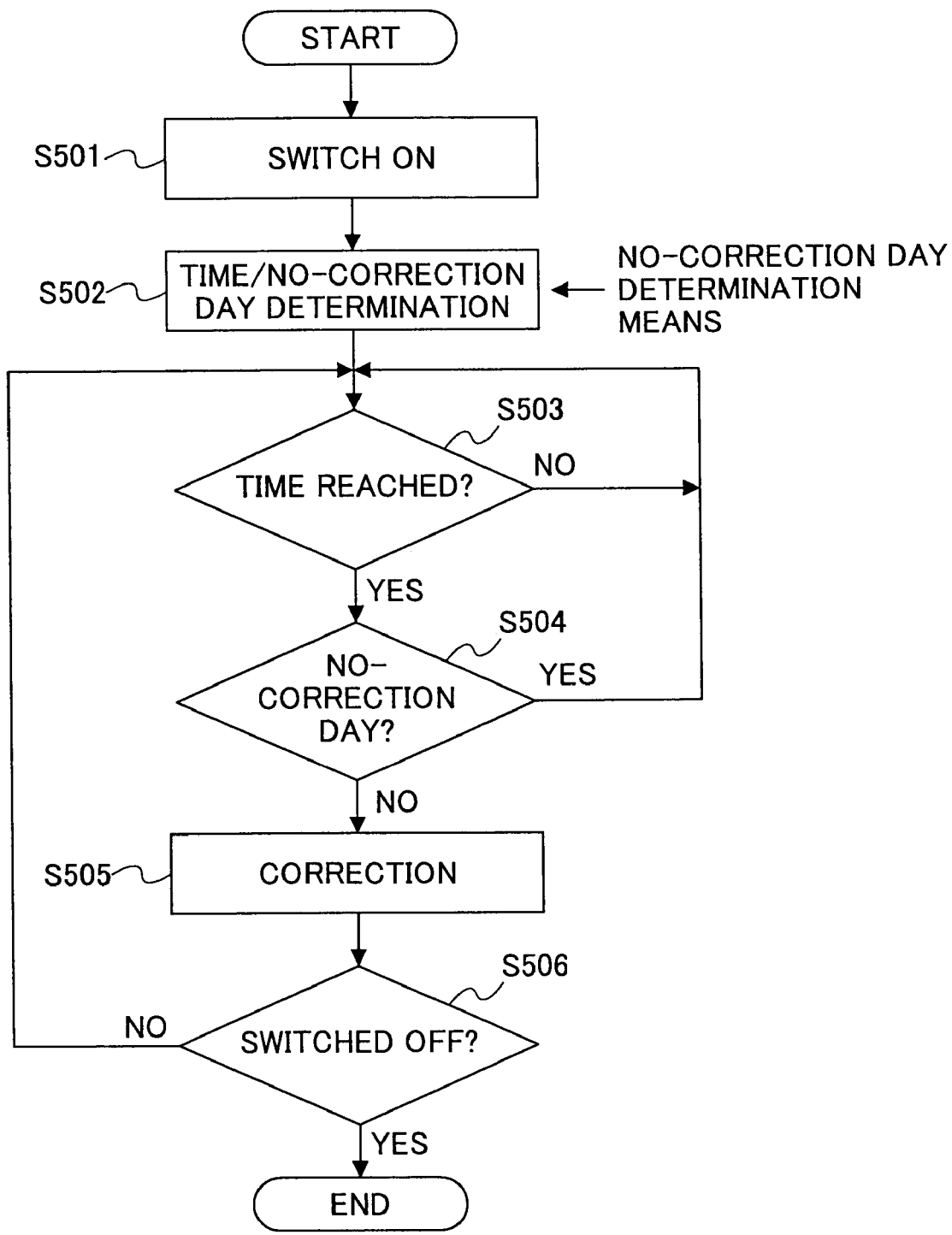
FIG. 12 is an operational flow chart of a fifth embodiment according to the present invention using the color-image forming device of FIG. 3.

FIG. 12 is an operational flow chart of a fifth embodiment according to the present invention. When the color-image forming device is switched on (S501), a no-color-drift correction day in addition to the color-drift correction execution time is set by no-color-drift correction day setting means (S502). Then, it is determined whether the set color-drift correction execution time is reached (S503). When it is determined that the color-drift correction execution time is reached, it is determined whether the current day is a no-color-drift correction day (whether the current day is a day on which the color-drift correction is not to be executed) (S504). When it is determined that the current day is not a no-color-drift correction day, the color-drift correction is executed at the previously set color-drift correction execution time by the automatic color-drift correction means (S505). When the color-image forming device is switched off after S505, the process ends and when the device is not switched off after S505, the process returns to S503 (S506).

The fifth embodiment according to the present invention enables setting the color-drift correction execution time as in the second embodiment of the present invention but on a day-of-the-week basis. For example, in offices, it is possible to set the color-image forming device not to execute the color-drift correction on days other than the working days. Accordingly it is possible to save recording material and power necessary for the color-drift correction.

Figure 13:
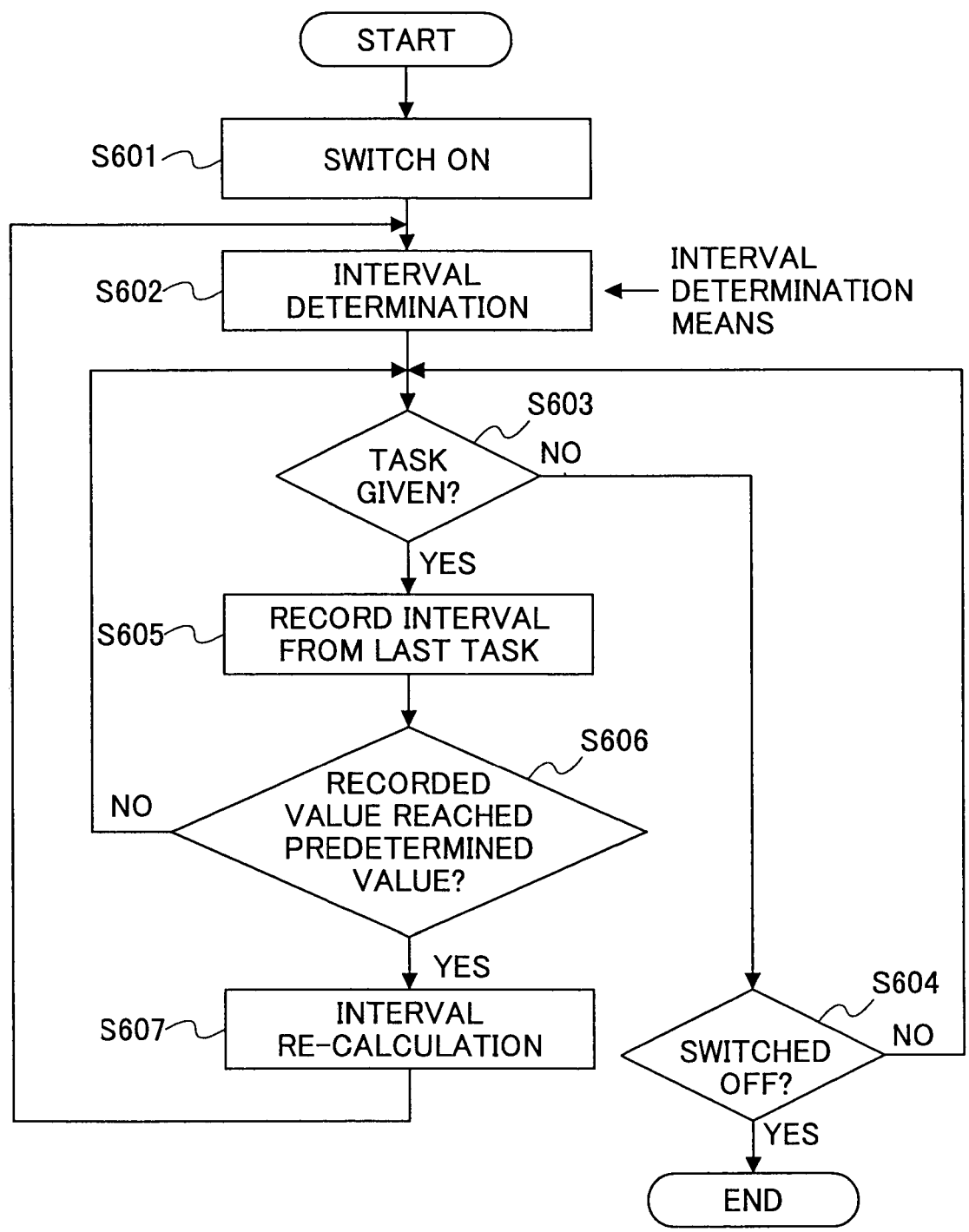
FIG. 13 is an operational flow chart of a sixth embodiment according to the present invention using the color-image forming device of FIG. 3.

FIG. 13 is an operational flow chart of a sixth embodiment according to the present invention. When the color-image forming device is switched on (S601), the color-drift correction execution interval is set by the color-drift correction execution interval setting means (S602). Then, it is determined whether the device is given a task (S603). When it is determined that the device is not given a task and also when the device is switched off, then the process ends. When it is determined that the device is not given a task but the device is not switched off, the process returns to S603 (S604). When it is determined that the device is given a task in S603, the time interval from the last task is recorded (S605). Then, it is determined whether the recorded value has reached a predetermined value (S606). When it is determined that the recorded value has not yet reached the predetermined value, the process returns to S603 and when it is determined that the recorded value has reached the predetermined value, the color-drift correction execution interval is re-calculated (S607) and then the process returns to S602.

The sixth embodiment according to the present invention measures the intervals between device tasks and enables the automatic setting of the color-drift correction execution interval based on an average value of the measured intervals. Accordingly, an optimal value for the color-drift correction execution interval can be automatically set based on the actual usage frequency of the device without the user's intervention and thus the user-friendliness of the device is improved.

Figure 14:
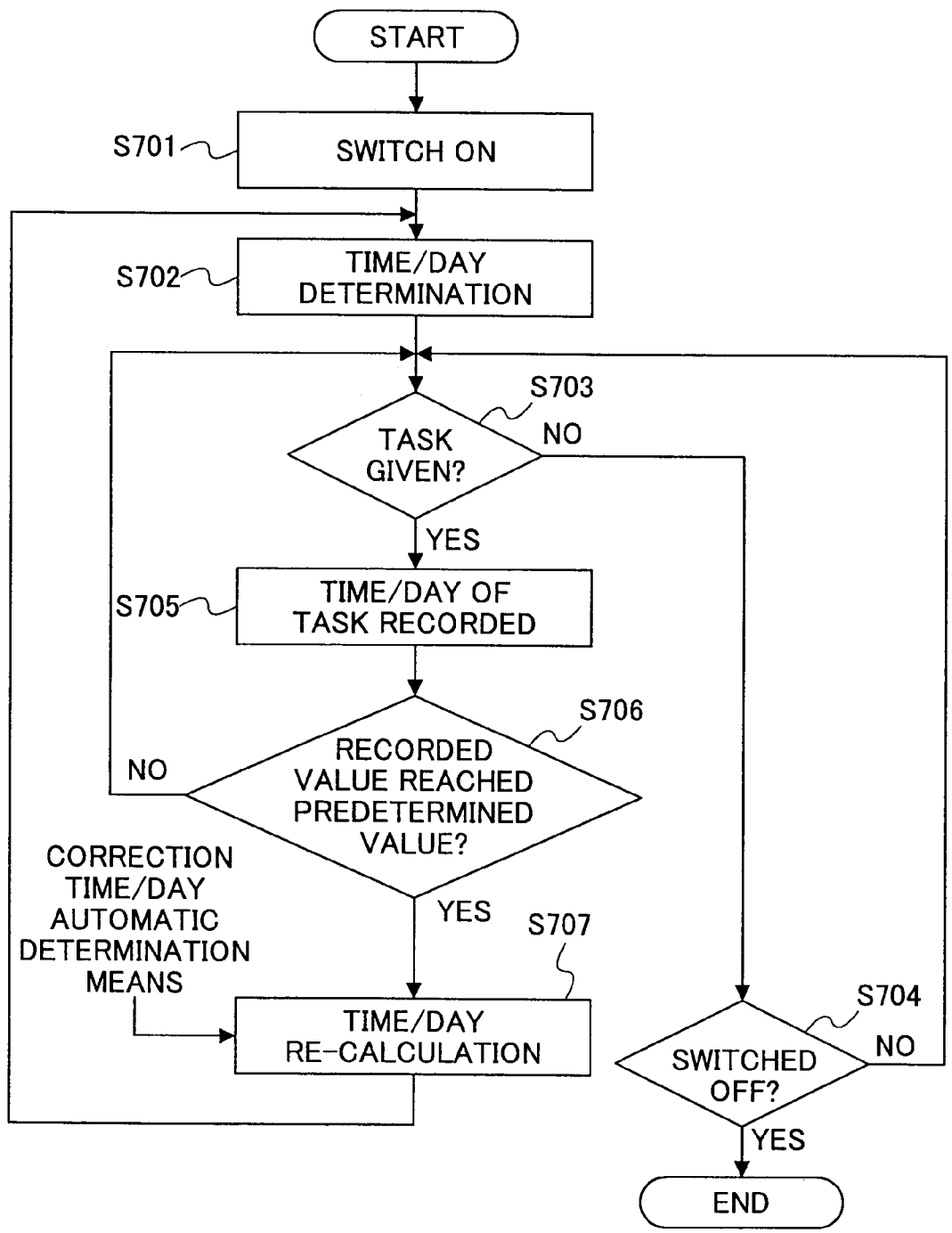
FIG. 14 is an operational flow chart of a seventh embodiment according to the present invention using the color-image forming device of FIG. 3.

FIG. 14 is an operational flow chart of a seventh embodiment according to the present invention. When the color-image forming device is switched on (S701), the color-drift correction execution time is set by the color-drift correction execution time setting means (S702). Then, it is determined whether the device is given a task (S703). When it is determined that the device is not given a task and also when the device is switched off, then the process ends. When it is determined that the device is not given a task but the device is not switched off, the process returns to S703 (S704). When it is determined that the device is given a task in S703, the time of the task is recorded (S705). Then, it is determined whether the recorded value has reached a predetermined value (S706). When it is determined that the recorded value has not yet reached the predetermined value, the process returns to S703 and when it is determined that the recorded value has reached the predetermined value, the color-drift correction execution time is re-calculated (S707) and the process returns to S702.

The seventh embodiment according to the present invention records the time of the device tasks and enables automatically setting optimal time for color-drift correction based on, for example, a histogram of the time of the device tasks. For example, if the usage frequency were high between 10 a.m. to 5 p.m., then it would be set that the color-drift correction is to be executed sometime before 10 a.m., for example, at 9 a.m. Accordingly, since the optimal time for color-drift correction is automatically set based on the actual device usage frequency without user's intervention, the user-friendliness of the device is improved. In addition, if the day-of-the-week is also to be recorded when the time of device task is recorded, it is also possible to automatically determine that the color-drift correction is not to be executed on holidays.

The following three embodiments show operations of the color-image forming device after the device starts the color-drift correction.

Figure 15:
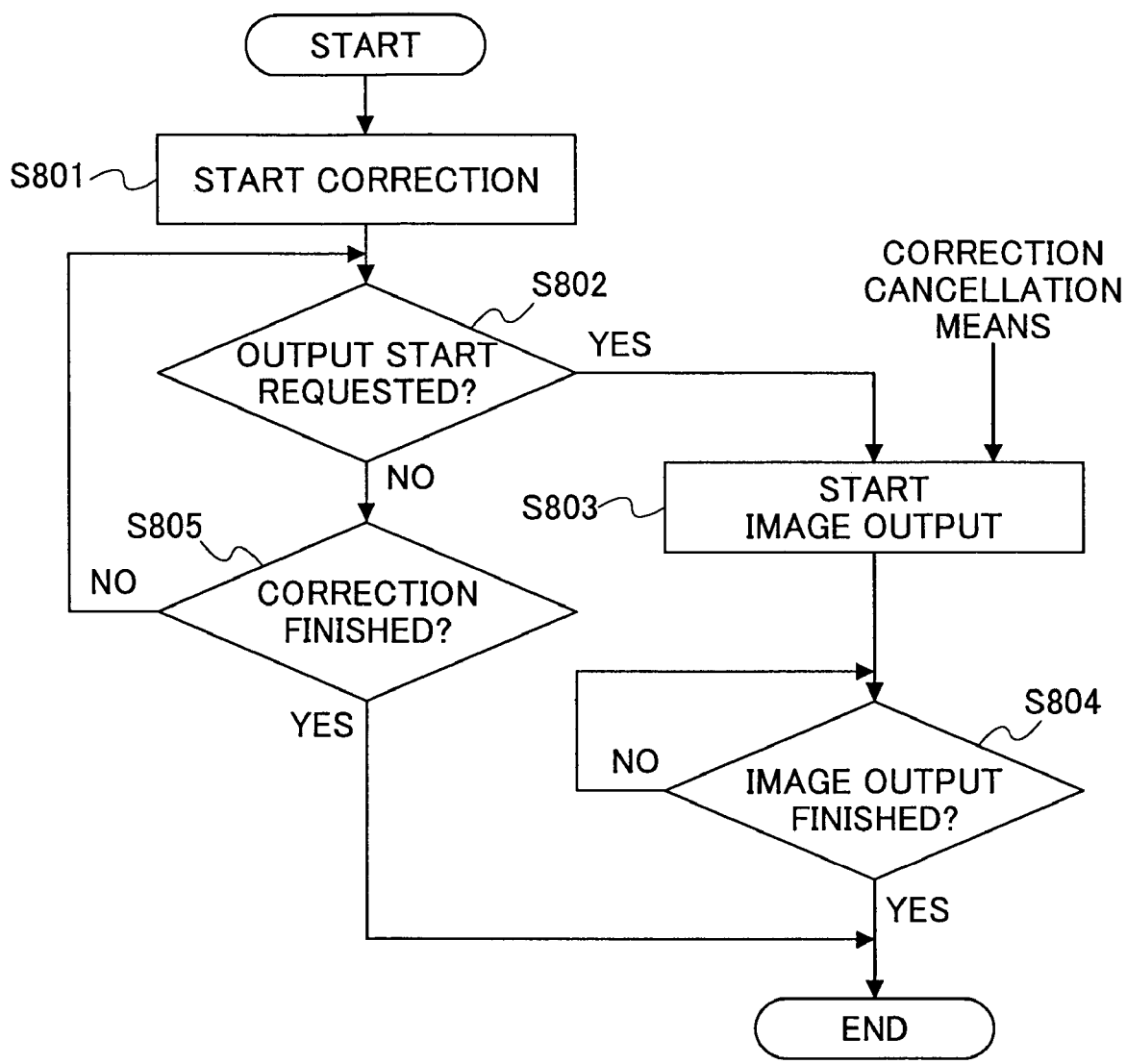
FIG. 15 is an operational flow chart of an eighth embodiment according to the present invention using the color-image forming device of FIG. 3.

FIG. 15 is an operational flow chart of an eighth embodiment according to the present invention. After the color-drift correction is started (S801), it is determined whether an output start is requested (S802). When it is determined that the output start is requested, an image output starts (S803). When the image output is finished (S804), then the process ends. When it is determined that the output start is not requested in S802 and that the color-drift correction is not yet finished (S805), then the process returns to S802.

The eighth embodiment according to the present invention handles the situation where once the color-image forming device starts the color-drift correction, a printout of an image cannot be quickly obtained since the color-drift correction needs a certain period of time. Specifically, in the eighth embodiment according to the present invention, even when the device has already started the color-drift correction, if the output start is requested, the color-drift correction is canceled and the output operation is given priority. By doing so, it is possible to meet the user's demand of quickly obtaining the image output.

Figure 16:
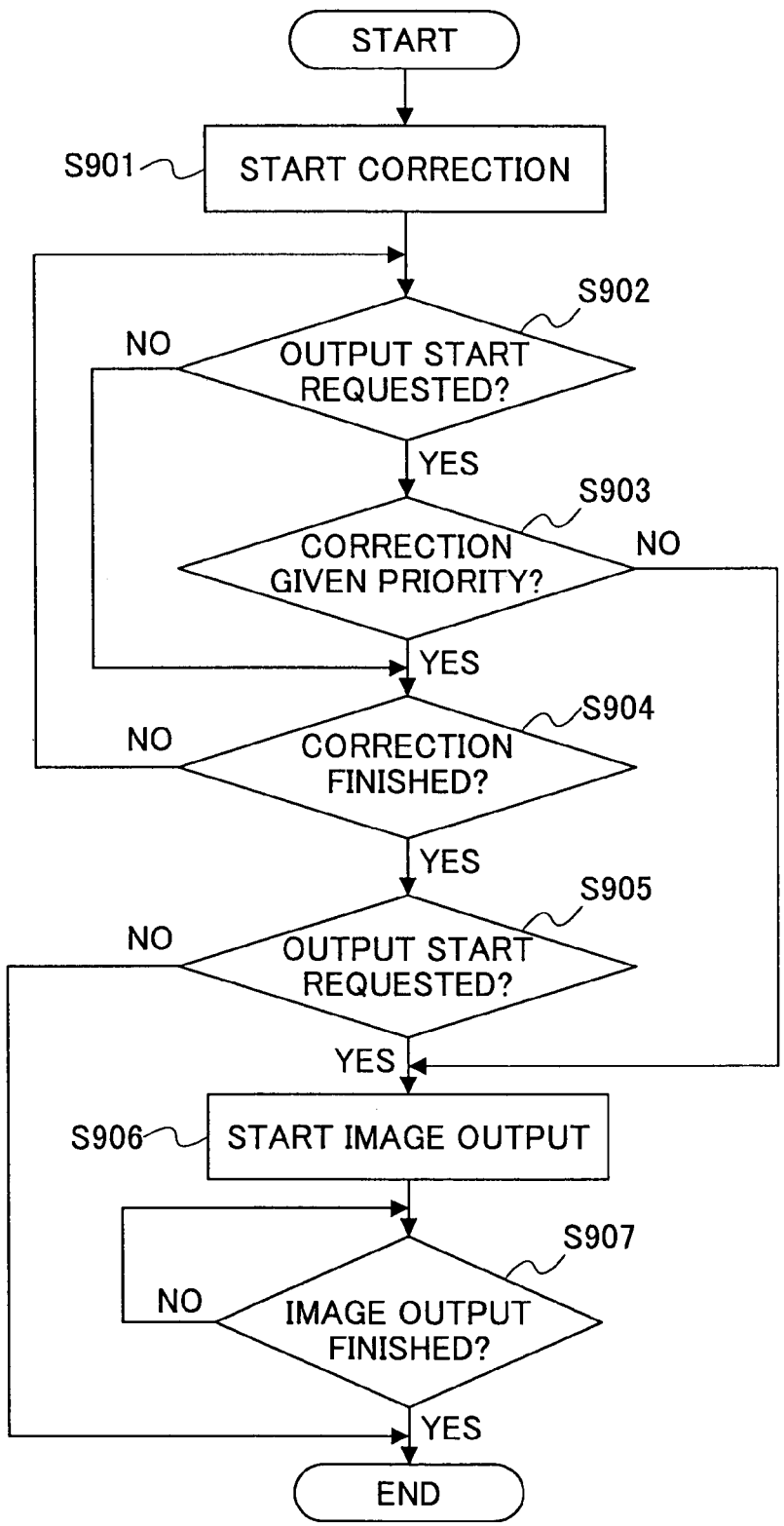
FIG. 16 is an operational flow chart of a ninth embodiment according to the present invention using the color-image forming device of FIG. 3.

FIG. 16 is an operational flow chart of a ninth embodiment according to the present invention. After the color-drift correction is started (S901), it is determined whether the output start is requested (S902). When the output start is requested, it is determined whether the color-drift correction is given priority (S903). When the color-drift correction is given priority and also when the output start is not requested as determined in S902, it is determined whether the color-drift correction is finished (S904). When the color-drift correction is not yet finished, the process returns to S902. When the color-drift correction is finished, it is determined whether the output start is requested (S905). When the output start is not requested, the process ends. When the output start is requested and also when the color-drift correction is not given priority as determined in S903, the image output starts (S906) and the process ends when the image output is finished (S907).

The ninth embodiment according to the present invention is a variation of the eighth embodiment according to the present invention in which the priority can be determined between the color-drift correction operation and the output operation, thus enabling the setting of the color-image forming device according to the user's need.

Figure 17:
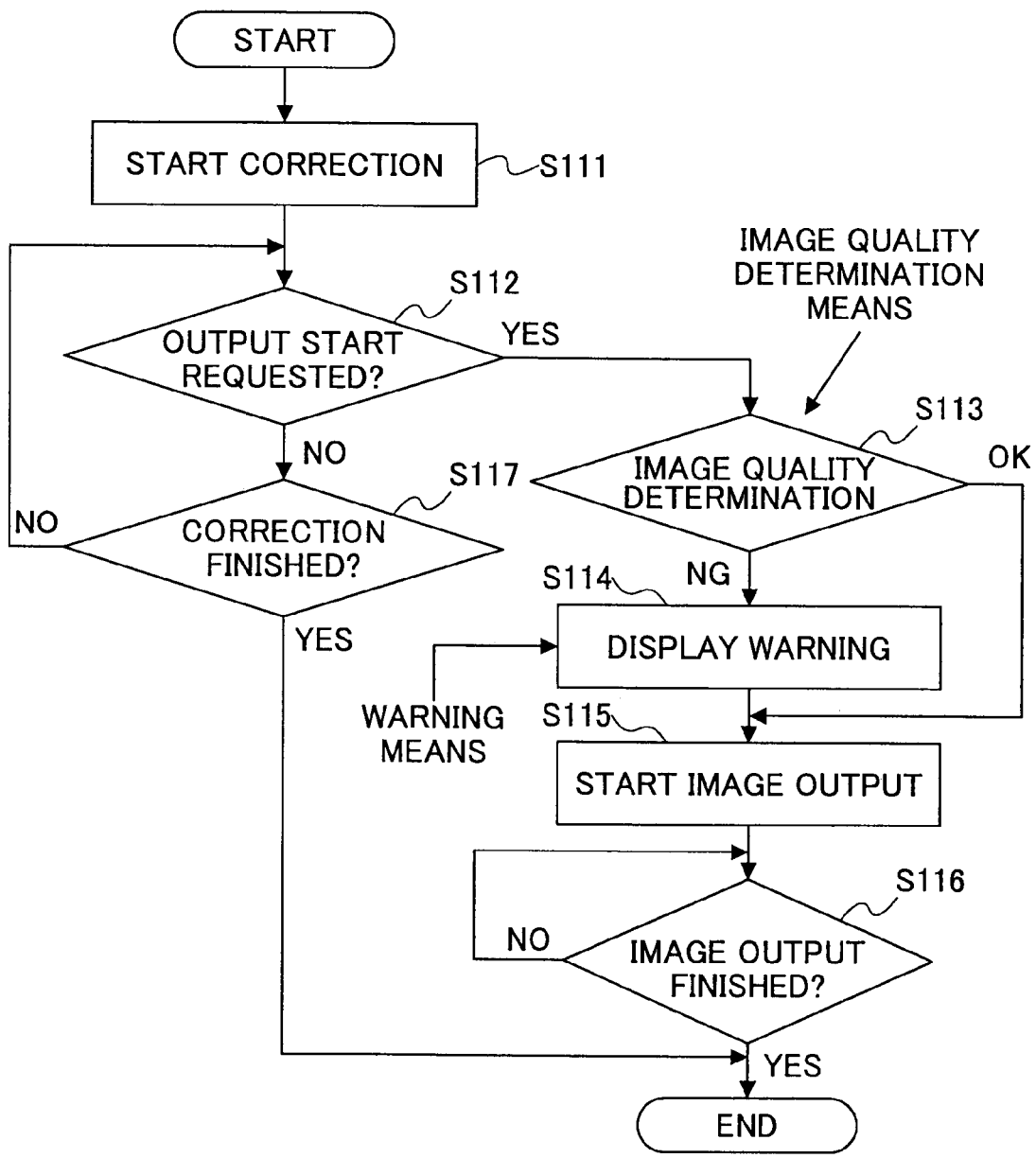
FIG. 17 is an operational flow chart of a tenth embodiment according to the present invention using the color-image forming device of FIG. 3.

FIG. 17 is an operational flow chart of a tenth embodiment according to the present invention. After the color-drift correction is started (S111), it is determined whether the output start is requested (S112). When it is determined that the output start is requested, image quality determination is executed by image quality determination means (S113). When the image quality is not satisfactory (NG), image output starts (S115) after giving a warning display (S114). When the image quality is satisfactory (OK), the image output starts (S115) immediately. When the image output finishes (S116), then the process ends. When it is determined that the output start is not requested at S112, it is determined whether the color-drift correction is finished (S117). When it is determined that the color-drift correction is finished, the process ends and when it is determined that the color-drift correction has not yet finished, the process returns to S112.

Here, the image quality determination means can be realized as a part of the color-drift correction means, which image quality determination means can detect the pattern for the color-drift correction and determine the amount of color drift.

Accordingly, for example, when the output is requested during the color-drift correction, the pattern detection part of the image quality determination means detects the amount of color drift. When the detected amount of color drift exceeds a predetermined amount of color drift, a warning may be provided to the user. When the detected amount of color drift is below the predetermined amount of color drift, then it will be determined as that the image quality is satisfactory and therefore there is no need of color-drift correction, and the warning is not provided to the user. The predetermined amount of color drift can be determined according to the output characteristics of the actual device to be used through adjustment. In addition, when the output is requested during the transferring of the patterns for color-drift correction, since the image quality cannot be assured, the warning should be provided to the user.

The tenth embodiment according to the present invention is another variation of the eighth embodiment according to the present invention in which a warning is given to the user when the image quality is determined to be not satisfactory when the image output is requested during the color-drift correction. In the eighth embodiment according to the present invention, the user can obtain image output without any latency time; however, the image quality of the image output may not be satisfactory. Accordingly, in the tenth embodiment according to the present invention, the warning is given to the user to indicate that the image quality may not be satisfactory and thus the user-friendliness of the device is improved.

It is noted that the warning display of the color-image forming device in the tenth embodiment according to the present invention can be embodied as a lamp as an eleventh embodiment.

Further, the warning display of the color-image forming device in the tenth embodiment according to the present invention can be displayed on a screen of a personal computer on the output side as a twelfth embodiment according to the present invention. If the personal computer is connected through the PC interface 107, the color-image forming device and the personal computer can communicate with each other. Therefore, information from the color-image forming device can be transmitted to the personal computer through communication and such information can be displayed on the screen through the usage of a driver. An example of display of such information is shown in FIG. 18.

Further, the present invention is not limited to these embodiments, and variations and modifications may be made without departing from the scope of the present invention.

The present application is based on Japanese priority application No. 2002-275656 filed on Sep. 20, 2002, the entire contents of which are hereby incorporated by reference.

What is claimed is:

1. A color-image forming-device comprising:
    a color-image forming unit for forming a color image by superimposing a plurality of images corresponding to a plurality of colors onto a recording medium;
    an automatic color-drift correction unit for executing a correction of color drift generated during the superimposition of the images;
    a color-drift correction execution interval setting unit for variably setting color-drift correction execution intervals, at which color-drift correction execution intervals said automatic color-drift correction executes the color-drift correction; and
    a task interval measuring unit for measuring intervals, at which intervals tasks are given to said color-image forming device; wherein
    said color-drift correction execution interval setting unit sets the color-drift correction execution intervals based on the measured result from said task interval measuring unit.

2. A color-image forming device comprising:
    a color-image forming unit for forming a color image by superimposing a plurality of images corresponding to a plurality of colors onto a recording medium;

an automatic color-drift correction unit for executing a correction of color drift generated during the superimposition of the images;

a color-drift correction execution interval setting unit for variably setting color-drift correction execution intervals, at which color-drift correction execution intervals said automatic color-drift correction executes the color-drift correction;

a color-drift correction execution time setting unit for setting a color-drift correction execution time, at which color-drift correction execution time said automatic color-drift correction starts the color-drift correction; and a task time measuring unit for measuring times, at which times tasks are given to said color-image forming device; wherein said color-drift correction execution time setting unit sets the color-drift correction execution time based on the measured result from said task time measuring unit.

3. A color-image forming device comprising:

color-image forming means for forming a color image by superimposing a plurality of images corresponding to a plurality of colors onto a recording medium;

automatic color-drift correction means for executing a color-drift correction of color drift generated during the superimposition of the images;

color-drift correction execution interval setting means for variably setting color-drift correction execution intervals said automatic color-drift correction means executes the color-drift correction; and task interval measuring means for measuring intervals, at which intervals tasks are given to said color-image forming device; wherein said color-drift correction execution interval setting means set the color-drift correction execution intervals based on the measured result from said task interval measuring means.

4. A color-image forming device comprising:

color-image forming means for forming a color image by superimposing a plurality of images corresponding to a plurality of colors onto a recording medium;

automatic color-drift correction means for executing a color-drift correction of color drift generated during the superimposition of the images;

color-drift correction execution interval setting means for variably setting color-drift correction execution intervals, at which color-drift correction execution intervals said automatic color-drift correction means executes the color-drift correction;

color-drift correction execution time setting means for setting a color-drift correction execution time, at which color-drift correction execution time said automatic color-drift correction means starts the color-drift correction; and task time measuring means for measuring times, at which times tasks are given to said color-image forming device; wherein said color-drift correction execution time setting means set the color-drift correction execution time based on the measured result from said task time measuring means.

5. A method for controlling color-drift correction timing of a color-image forming device, said method comprising the steps of:

forming a color image by superimposing a plurality of images corresponding to a plurality of colors onto a recording medium;

variably setting a color-drift correction execution intervals, at which color-drift correction execution intervals an automatic color-drift correction unit executes a correction of color drift generated during the superimposition of the images;

executing the color-drift correction by said automatic color-drift correction at the previously set color-drift correction execution intervals; and measuring intervals, at which intervals tasks are given to said color-image forming device; wherein said step of variably setting a color-drift corre&ion intervals further comprising the steps of:

setting the color-drift correction execution intervals based on the measured interval.

6. A method for controlling color-drift correction timing of a color-image forming device, said method comprising the steps of:

forming a color image by superimposing a plurality of images corresponding to a plurality of colors onto a recording medium;

variably setting a color-drift correction execution intervals, at which color-drift correction execution intervals an automatic color-drift correction unit executes a correction of color drift generated during the superimposition of the images;

executing the color-drift correction by said automatic color-drift correction at the previously set color-drift correction execution intervals;

setting a color-drift correction execution time, at which color-drift correction execution time said automatic color-drift correction starts the color-drift correction; and measuring times, at which times tasks are given to said color-image forming device; wherein said step of setting a color-drift correction execution time further comprising the steps of: setting the color-drift correction execution time based on the measured time.

* * * * *